(12) United States Patent
Bastidas (10) Patent No.: US 12,505,643 B2
(45) Date of Patent: Dec. 23, 2025

(54) METHOD AND SYSTEM FOR MANAGING LOST ITEMS

(71) Applicant: SITA Information Networking Computing UK Limited, Middlesex (GB)

(72) Inventor: Tupac Bastidas, Middlesex (GB)

(73) Assignee: SITA Information Networking Computing UK Limited, Hayes (GB)

( * ) Notice: Subject to any disclaimer, the term of this patent is extended or adjusted under 35 U.S.C. 154(b) by 209 days.

(21) Appl. No.: 18/454,347

(22) Filed: Aug. 23, 2023

(65) Prior Publication Data

US 2023/0401817 A1 Dec. 14, 2023

Related U.S. Application Data

(63) Continuation of application No. PCT/GB2022/050519, filed on Feb. 25, 2022.

(30) Foreign Application Priority Data

Feb. 26, 2021 (GB) .................................. 2102812
Apr. 16, 2021 (EP) .................................. 21169001

(51) Int. Cl.
*G06V 10/74* (2022.01)
*G06Q 10/083* (2024.01)
(Continued)

(52) U.S. Cl.
CPC ........... *G06V 10/74* (2022.01); *G06Q 10/083* (2013.01); *G06Q 30/015* (2023.01); *G06V 10/42* (2022.01);
(Continued)

(58) Field of Classification Search
CPC ...... G06V 10/74; G06V 10/42; G06V 10/764; G06V 2201/10; G06Q 30/015; G06Q 10/083
(Continued)

(56) References Cited

U.S. PATENT DOCUMENTS 9,996,890 B1 * 6/2018 Cinnamon ........... G06V 10/764
2015/0131868 A1 * 5/2015 Rooyakkers ........ G06F 16/5866
382/110
(Continued)

OTHER PUBLICATIONS

International Preliminary Report on Patentability for International Application No. PCT/GB2022/050519, mailed Sep. 7, 2023, 09 Pages.
(Continued)

*Primary Examiner* — Allen H Nguyen
(74) *Attorney, Agent, or Firm* — Bradley Arant Boult Cummings LLP; Daniel E. Sineway, Esq.; Adam J. Thompson, Esq.

(57) ABSTRACT

A system and method for managing lost items is described. The system comprises an application that receives information associated with one or more found items, which includes an image of each found item, and item-related information associated with a lost item. An image processing module identifies metadata associated with each found item based on the image of each found item and the received information associated with each found item. A matching engine determines a score for each found item based on a comparison between the item-related information for the lost item and the metadata associated with each found item.

20 Claims, 5 Drawing Sheets

(51) Int. Cl.
*G06Q 30/015* (2023.01)
*G06V 10/42* (2022.01)
*G06V 10/764* (2022.01)

(52) U.S. Cl.
CPC ........ *G06V 10/764* (2022.01); *G06V 2201/10* (2022.01)

(58) Field of Classification Search
USPC ......................................................... 382/103
See application file for complete search history.

(56) References Cited

U.S. PATENT DOCUMENTS

| | | | |
|---|---|---|---|
| 2016/0357872 A1* | 12/2016 | Fader | G06Q 10/00 |
| 2018/0114134 A1 | 4/2018 | Alva | |
| 2023/0186509 A1* | 6/2023 | Ryan | G06V 10/774 |
| | | | 382/103 |

OTHER PUBLICATIONS

International Search Report and Written Opinion for International Application No. No. PCT/GB2022/050519, mailed May 13, 2022, 11 Pages.
International Search Report and Written Opinion issued in International Application No. PCT/GB2022/050519 mailed May 13, 2022.

\* cited by examiner

METHOD AND SYSTEM FOR MANAGING LOST ITEMS

CROSS-REFERENCE TO RELATED APPLICATIONS

This application is a continuation of International Patent Application No. PCT/GB2022/050519, filed on Feb. 25, 2022 and entitled "A METHOD AND SYSTEM FOR MANAGING LOST ITEMS," which claims the benefit of and priority of: EP Patent Application No. 21169001.1, filed Apr. 16, 2021 and entitled "A METHOD AND SYSTEM FOR MANAGING LOST ITEMS," and GB Patent Application No. 2102812.1, filed Feb. 26, 2021 and entitled "A METHOD AND SYSTEM FOR MANAGING LOST ITEMS," which are each incorporated by reference herein in their entireties.

FIELD OF INVENTION

The invention relates to a lost item management system and method, particularly for use in reuniting users with items of lost property.

BACKGROUND

In the air transport industry (ATI), every year millions of dollars are spent reuniting lost property with passengers. Typically, for a tier 1 airline, 140,000 passengers fly every day and 4% of those passengers (around 5,600) leave personal possessions behind every day while travelling. This means more than 100 million items are left behind annually, which is forecast to grow year on year with passenger volumes.

The burden of repatriating (i.e. successfully returning) lost property will therefore increase, as well as the overall value of the lost property, which increases the liability risk for the parties responsible for the lost property. For example, a typical major airline might handle 1 million lost items each year. For those items, the successful repatriation rate (i.e. the amount of lost items that are successfully reunited with a passenger) might be approximately 10%, and the average amount of time that each item is stored by the airline might be approximately 3 months before the item is disposed of. Airline staff are required to spend significant amounts of time on managing and storing the lost property, as well as handling passenger enquiries, which might cost around $500,000 per year.

In addition to the above, the task of repatriating lost property is not straightforward—particularly in the ATI where the ownership of the lost property process is unclear due to multiple stakeholders involved the process, such as airlines, airports, and service contractors within the airport environment. For the ATI, airlines are the first point of contact for passengers during the lost property repatriation process, however the airline is not always the party responsible for the lost property.

In addition, there is no global database or repository for found items. This means that if a lost property report is created by two stakeholders, for example American Airlines and KLM, then both of the stakeholders cannot access the report on a single database (KLM could not search for the report on American Airline's database). This also means that airport agents at a first location cannot access the found items records at a second location.

The lack of control and visibility over the lost property process for passengers leads to a negative passenger experience, which could adversely affect an airline's reputation and profitability.

Existing lost property solutions are over-complicated, expensive and/or not specific to the above problems. There is therefore a need for an improved lost property repatriation system that overcomes or ameliorates the problems described above.

SUMMARY OF INVENTION

The invention is defined by the independent claims, to which reference should now be made. Preferred features are set out in the dependent claims.

In a first aspect of the invention, a method for managing lost items comprises receiving information associated with one or more found items, the received information including characteristics of an image of each found item, generating metadata associated with each found item based on the characteristics of the image of each respective found item, receiving item-related information associated with a lost item, generating metadata associated with the lost item based on the item-related information, and determining a score for each found item based on a comparison between the item-related information for the lost item and the metadata associated with each found item.

In an embodiment of the invention, if the determined score exceeds a threshold value the method further comprises determining that one of the one or more found items matches the lost item.

In another embodiment of the invention, the method further comprises sending a verification request to a customer associated with the lost item to verify that the corresponding found item belongs to the customer.

In another embodiment of the invention, if a found item is verified by the customer the method further comprises sending a further verification request to a handling agent to verify that the found item matches the lost item.

In another embodiment of the invention, the method further comprises requesting auxiliary item-related information if one or more found items are not verified by the customer.

In another embodiment of the invention, the method further comprises requesting auxiliary item-related information if the determined score does not exceed the threshold value.

In another embodiment of the invention, the method further comprises periodically monitoring for matches based on received information associated with further found items if the determined score does not exceed the threshold value.

Embodiments of the invention further comprise sending a notification indicating that a lost item has been found if the found item is verified by the customer and/or the handing agent.

In another embodiment of the invention, a score is determined for a set of found items, the set of found items being based on the current status of the lost item, and the time since the found item was discovered.

In another embodiment of the invention, determining a score comprises determining individual scores for each of a plurality of item categories associated with the lost item and each of the found items and summing the individual scores.

In another embodiment of the invention, determining the individual scores for each item category comprises analysing one or more text strings associated with the corresponding item category for the lost item and each of the found items.

In another embodiment of the invention, determining the individual scores for each item category is based on a predetermined weighting coefficient allocated to each item category.

Embodiments of the invention further comprise analysing the image of each found item to automatically determine the characteristics of the image and a set of characteristic values associated with the found item.

In another embodiment of the invention, the received information associated with each found item includes location information indicative of where the item was found.

Embodiments of the invention further comprise receiving customer-related information associated with a customer who owns the lost item.

Embodiments of the invention further comprise cooperating with a flight information module to retrieve passenger journey information associated with the customer who owns the lost item.

In another embodiment of the invention, determining a score for each found item is also based on a comparison between the location information associated with each found item and the retrieved passenger journey information.

Embodiments of the invention further comprise cooperating with a delivery module to arrange delivery of the found item to the customer.

In an embodiment of the invention, the delivery module interfaces with one or more courier delivery services to enable a lost item to be returned.

Embodiments of the invention further comprise cooperating with an e-commerce module to receive payment from the customer for repatriating the found item.

Embodiments of the invention further comprise generating a two dimensional bar code associated with each of the one or more found items.

In a second aspect of the invention, a system for managing lost items comprises an application configured to receive information associated with one or more found items, the received information including characteristics of an image of each found item, the application being further configured to receive item-related information associated with a lost item, the application being further configured to generate metadata associated with each found item based on the characteristics of the image of each respective found item, and metadata associated with the lost item and received information associated with each found item, and a matching engine configured to determine a score for each found item based on a comparison between the item-related information for the lost item and the metadata associated with each found item.

In an embodiment of the invention, the application is implemented on a cloud-based server.

Embodiments of the invention further comprise a multi-tenancy data store configured to store the information associated with one or more found items and the item-related information associated with the lost item.

Embodiments of the invention further comprise a portal configured to provide the item-related information associated with the lost item.

Embodiments of the invention further comprise networked devices configured to provide the information associated with each found item.

In a third aspect of the invention, a method of recording found items comprises receiving information associated with one or more found items, the received information including characteristics of an image of each found item, generating metadata associated with each found item based on the characteristics of the image of each respective found item, and populating a shared database with a report including the generated metadata.

In an embodiment of the invention, the received information includes one or more of an item title, a location associated with the found item, an airline associated with the found item, a date of travel associated with the found item, a flight number associated with the found item, a seat number associated with the found item, a tail number of the aircraft associated with the found item, and a terminal and/or gate number associated with the found item.

In an embodiment of the invention, the characteristics of an image of each found item include one or more of a brand name associated with the found item, a model name or number associated with the found item, size dimensions associated with the found item, a colour associated with the found item, a material associated with the found item, and a shape associated with the found item.

In an embodiment of the invention, supplementary data associated with the found item is included in the report.

In some embodiments, the supplementary data includes one or more of a photograph associated with the found item, the time the item was found, an airport associated with the found item, and an identifier associated with the agent who found the item.

DETAILED DESCRIPTION

Embodiments of the invention will now be described, by way of example only, with reference to the accompanying drawings, in which.

The specific embodiments of the invention described below relate to the aviation industry, but this is exemplary and other applications of the invention will also be discussed. For example, the system may be used in any environment where lost articles are reconciled. Thus, embodiments of the invention find application in other travel industries, such as rail, coach, bus, and cruises. In addition, embodiments of the invention may find application in large scale events, for example large-gathering events such including World Cups, Olympic Games, concerts and festivals.

By way of overview, embodiments of the invention register lost items in a single shared database and use photographs of the item to generate metadata associated with the lost item. Passenger enquiries are automatically matched with the listed items in the database to produce a report for passengers via a self-service portal and passengers may arrange for collection of the items of lost property. Embodiments of the invention may also enable passengers to use the system as a communications hub to engage with the lost article repatriation process via the self-service portal. Embodiments of the invention may also provide statistical reports and dashboards for stakeholders (such as airports, airlines or event managers), and may also serve as a platform for passengers to provide financial reconciliation to stakeholders in return for successful repatriation of lost items.

Embodiments of the invention may cooperate with cloud-based applications that facilitate the above-described problems relating to lost property to be solved on a global scale. Embodiments of the invention may allow stakeholders to handle lost and found issues promptly and accurately, reuniting passengers with their lost property and ensuring GDPR compliance. In addition, the use of cloud-based applications enables embodiments of the invention to be implemented globally across a network of devices at low expense and programming burden.

Embodiments of the invention generate metadata from photographs of lost items using image recognition software that identifies each item, and extracts metadata associated with properties of each image. A report may then be generated, making it fast and easy to register lost items. The use of intelligent data generation, and an automated matching engine to link passenger enquiries to items listed in the database, reduces manual work performed by stakeholders, reduces error and increases the chance that lost items will be repatriated.

A single shared database enables embodiments of the invention to be multi-tenancy. In other words, embodiments of the invention include a software architecture whereby multiple individual groups of users or stakeholders share common access to a single instance of the software that runs on a single server. Examples of users or stakeholders in this instance may include: airport staff who find the lost items, staff that monitor and administer the repatriation system, airlines, and passengers.

The self-service portal may be a web interface that enables passengers to access the repatriation service at any time from any device connected to the internet, as well as reporting query results to passengers and enabling passengers to organise payment and delivery of the lost items. Automated communications via the self-service portal may keep passengers informed of the status of their query by sending customized messages at every stage of the process. The service may also provide dashboards to stakeholders that include detailed statistics and allow for data-driven decisions to be made.

For stakeholders, embodiments of the invention advantageously: reduces staff workload and operational costs by automating many of the lost property procedures such as handling passenger enquiries and matching enquiries with found items; improves accuracy and rate that lost items are returned which can reduce costs associated with storing and managing or administering lost items; and provides an opportunity for stakeholders to generate additional revenue to cover some of their costs to store lost items.

For users, embodiments of the invention advantageously: offers a quick and simple interface to register lost items; ensures the repatriation system is accessible online at any time from any location for reporting lost property and organizing delivery or collection; and enables customers to take control of the lost property process and provides enhanced visibility of the process to customers.

For the above example, where the repatriation rate is approximately 10%, embodiments of the invention are able to improve the rate of repatriated items by 10-20%, with the rate of items returned within the first 48 hours increasing to approximately 60%. The average storage time can be reduced from around 3 months to 20 days, and the reduction in staff workload can save around $100,000 in direct costs alone. By charging a small handling fee per repatriated item, stakeholders could recover revenues of around $1 million per year.

Figure 1:
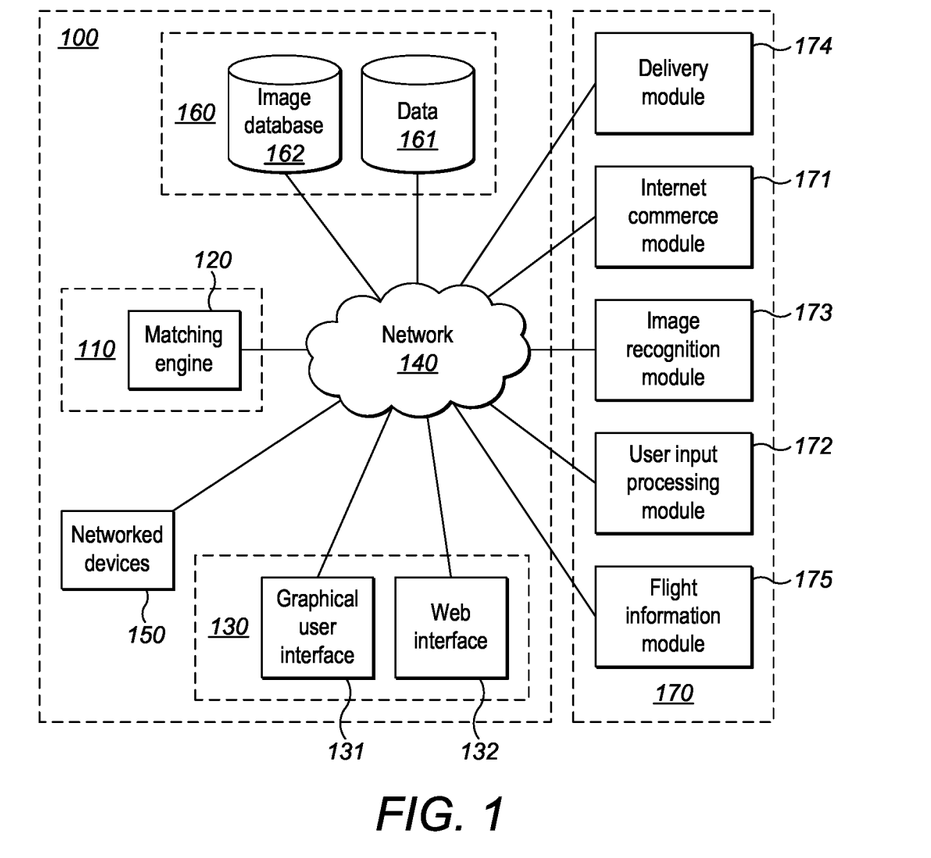
FIG. 1 shows a schematic block diagram of a lost item management system embodying the invention.

FIG. 1 shows a high level architecture of a system 100 according to an embodiment of the invention.

As shown in FIG. 1, an example system 100 includes: a lost items application 110, a matching engine 120, a self-service portal 130, and a user interface 135, which are connected via a network 140.

The lost items application 110 receives and responds to API queries, which preferably are in REST-JSON format. In some embodiments, the lost items application 110 is implemented on a cloud-based server, such as an EC2 instance. The application 110 is responsible for processing the requests from the user interface 130 according to the business logic. In preferred embodiments, the application is a Java-based application, configured to be managed as a Unix service, that consumes data via a REST Applications Interface (API), which is provided to other interfaces and acts as a main connector to a store of data. The application 110 is also responsible for interactions with third-party APIs, as further described below. In preferred embodiments, the lost items application 110 is located on a cloud server, which enables the lost items application to be smoothly and easily deployed across many networked devices 150 that can be accessed by stakeholders and users at any time.

In preferred embodiments, the matching engine 120 automatically analyses enquiries, compares properties of lost items and metadata of found items and attributes a score to each matched result. The application 110 may automatically notify users if a potential match is identified.

In preferred embodiments, the matching engine 120 operates in the following way.

In a first phase the matching engine 120 may reduce the data to be analysed in order to optimise the performance and efficiency of the matching process. The number of found items to be analysed is reduced by filtering found items using the following criteria: first, the status of the lost item must be "ONGOING", i.e. the lost item has not been disposed of or repatriated; and second, the "Losing Time", i.e. the time that has passed since the found item was discovered, must be less than a predetermined amount, for example 48 hours after finding the item. Additionally, the results may be further filtered based on information provided by the customer. For example, the number of found items may be filtered based on the Departure airport code or the Arrival airport code indicated by the customer. In addition, the found items can be filtered by the Item Categories provided by the customer (for example: "Mobile Phone" or "Sunglasses"). In preferred embodiments, example item categories and/or criteria include: Adult/Child, Brand, Colour, Email Address, First Name, Last Name, Flight Date, Frequent Flyer Number, Gate, Gender, Item Identifier, Material, Phone Number, Place, Seat, Size, Tail Number, Terminal, Time and Title.

In a second phase, the matching engine 120 creates virtual matches between a lost item and each of the found items that result from the filtering above. In preferred embodiments, an individual score is calculated for each category and/or criteria and a total score between is calculated based on those individual scores. In some embodiments, the total score may be between 0 and 100.

In certain embodiments, the following scoring system may be applied.

Points are based on the quality of match between lost items and found items. The potential maximum amount of points is awarded for a particular item category if there is an exact match between the two items for that category. The exact amount of maximum points available may vary depending on the item category.

Table 1 below indicates an example set of maximum points awarded for various item categories.

TABLE 1

| Matching element (associated with found item) | Compared with (associated with lost item) | Maximum score |
|---|---|---|
| Brand information | Brand information | 3 |
| Cell phone | Any phone number | 15 |
| Colour and type | Colour and type | 18 |
| Email address | Email address | 40 |
| Flight and date | Flight and date | 9 |
| Frequent flier | Frequent flier | 10 |
| Family Name | Family Name | 20 |

The actual amount of points awarded will depend on the similarity between the item categories and any additional information relating to the category, i.e. the amount of variation to be expected for the item category. For example, there is no variation in the "airport" criteria, and so the awarded score for this item category may either be 0 or 100.

Categories that include variation may include criteria relating to time. For example, a proportional score between 0 and 100 may be given depending on how much time has passed between losing and finding the item, with a score of 0 representing more than 48 hours passing, and 100 representing less than one hour passing. As another example, a proportional score between 0 and 100 may be given depending how much time has passed between the departure date time for the lost item and the flight date of the found item. A score of 0 may represent more than 72 hours passing, and a score of 100 may represent less than one hour passing.

In preferred embodiments, in order to cope with time zone differences and the fact that flight date is often only stored in date-format only (i.e. without a time), one day may be added to the found item flight date. If the found item flight date is before the lost item departure time or less than 1 hour has passed between found item flight date and lost item departure date then the score that is assigned is 0. Otherwise it decreases proportionally from 100 depending on the time difference between them.

In some embodiments, potential matches between lost and found items are identified by determining whether a sequence of characters in a text string for each item category of each found item is the same, or substantially the same, as a sequence of characters in a text string of the corresponding item category for the lost item. In some embodiments, matching occurs based on a limited number of characters in a text string. For example, addresses may be matched according to the first 7 characters in the address text string, and brands may be matched according to the first 4 characters in the quoted text string.

In order to determine a total matching score, in preferred embodiments the individual scores described above may be multiplied by a corresponding coefficient and each resultant score is summed to provide a total matching score. Different properties may be allocated different weightings when determining a total matching score. This enables embodiments of the invention to give more weight (and thus, a higher score) to certain properties that are better at recognising potential matches. Different example coefficients are provided below in Table 2.

TABLE 2

| Property/Category | Coefficient |
|---|---|
| Brand | 0.05 |
| Colour | 0.15 |
| Adult | 0.65 |
| Model | 0.42 |
| Category | 0.33 |
| Email | 0.22 |
| First Name | 0.78 |
| Flight Date | 0.56 |
| Flight Number | 0.78 |
| Frequent Flyer Number | 0.48 |
| Gate | 0.78 |
| Gender | 0.32 |
| Item Identifier | 0.59 |
| Last Name | 0.66 |
| Material | 0.61 |
| Passenger Initials | 0.15 |
| Phone Number | 0.07 |
| Place | 0.36 |
| Seat | 0.12 |
| Size | 0.77 |
| Tail Number | 0.5 |
| Terminal | 1.5 |
| Time | 1.15 |
| Title | 0.68 |

For example, if a score of 80 is determined for a "time" criteria, then the calculated score would be 80*1.15=92.

The self-service portal 130 allows passenger to report lost property, check the status of their inquiry, organize payment and collection/delivery. In preferred embodiments, the self-service portal 130 includes a graphical user interface (GUI) 131 available for desktop and mobile devices, and preferably is implemented within a mobile application. The GUI uses an easy-to-learn layout and design to provide an intuitive experience thereby reducing training hours for staff. The self-service portal 130 further includes a web interface 132 that is capable of being embedded into websites. In preferred embodiments the GUI 131 is an Angular 8-based Web application that is responsible for interactions with users, handling their requests through human-friendly user interface, passing the requests to the lost items application 110 and processing the responses as well as for processing the data according to the business logic. The interaction with the lost items application 110 may be made through REST API.

The system 100 may further include a data store 160 that includes a main database 161 and an image database 162. Database 161 acts as the main data store of the application 110. In some embodiments the database 161 is a graph database such as a Neo4j Database and is located on the same instance as the application 110. Image database 162 acts as a storage for the images uploaded by the users. In some embodiments the image database 162 is located on an object storage service, such as the AWS S3. Images uploaded by users may be stored and provided back to the users as well as to the application 110 via a secure API.

In some embodiments, the system 100 cooperates with modules 170, for example to receive information relating to flight data and arrange for lost items to be delivered to customers. In some embodiments, one or more of the modules 170 may be external to the system 100.

The system 100 may cooperate with a first module that is an internet commerce module 171. The internet commerce module 171 acts as a platform for internet commerce. The internet commerce module is used in order to provide the customers with the ability to pay for certain services, such as the delivery of found items, or a handling fee. In preferred embodiments, fees may include an airline service fee, airline Value Added Tax, a lost item management service fee, a transaction fee, and a storage fee. Payments may be based on invoicing logic as well as online processing. In some embodiments, the internet commerce module 171 may cooperate with the application 110 via a software developments kit (SDK) that is based on a REST API. The API enables the system to process three separate transactions to three separate entities: a usage fee that is sent to the lost item management service provider, a handling fee that is sent to the entity that handles a customer enquiry; and a storage fee that is sent to the entity that assumes responsibility for the secure storage of found items. In some embodiments, the internet commerce module 171 is provided by a third party service such as Stripe, which may provide a unique payment ID and payment report that is visible to all parties and modules within the system 100.

The system 100 may cooperate with a second module that is a user input processing module 172. The user input processing module 172 acts as an online API platform that provides the ability to categorize customer input while processing data. In some embodiments, the user input processing module 172 may cooperate with the application 110 via a REST API. In some embodiments, the user input processing module 172 is provided by a third party service such as WitAi.

The system 100 may cooperate with a third module that is an image recognition module 173. The image recognition module 173 acts as an online API platform that provides an image recognition service. In some embodiments, the image recognition module 173 may cooperate with the application 110 via a REST API. In some embodiments, the image recognition module 173 is provided by a third party service such as CloudSight.

The system 100 may cooperate with a fourth module that is a delivery module 174. The delivery module 174 enables a found item to be delivered to a customer and may provide interfaces for choosing delivery options. The delivery module 174 may cooperate with the application 110 via a REST API. In some embodiments, the delivery module 174 is provided by a third party service such as DHL eCommerce.

The system 100 may cooperate with a fifth module that is a flight information module 175. The flight information module 175 provides flight related information, such as flight status or other flight data, for flights from airports around the world. In some embodiments, the flight information module 175 may cooperate with the application 110 via a REST API in order to pre-populate information fields with flight-related information based on information provided by a customer, and may also provide suggestions regarding input airlines or airports (for example, if the input data provided by the customer does not match an existing airline or airport). In some embodiments, the flight information module 175 is provided by a third party service such as the SITA Flight Information API.

System 100 may include the following further components, which are not shown in FIG. 1.

System 100 may include a translation engine that enables lost item reports to be provided in free text in a local language and for that local language to be translated into a common language, such as English.

System 100 may include a Deployment Server that is responsible for automated deployments of the application 110 and GUI 131 to all the environments (such as testing, and staging). In some embodiments, the Deployment Server may be installed on a separate cloud-based server, such as a further EC2 instance. System 100 may include Firewall or Security groups that act as a virtual firewall for the cloud-based servers to control inbound and outbound traffic. System 100 may include a Code Repository, which may contain, manage, and provide secure authenticated access to code branches of the application 110 and GUI 131. In some embodiments, the Code Repository provides a fully managed source control service that hosts secure Git-based repositories. System 100 may include an API Gateway that handles all the tasks involved in accepting and processing concurrent API calls, including traffic management, authorization and access control, monitoring, and API version management. Thus, the API Gateway hosts a REST API that acts as a "front door" for third-party applications and users to who access the application 110. The API Gateway may therefore provide a fully managed service that is responsible for maintaining, monitoring and securing internal API of the project. System 100 may include an authentication module, such as AWS Cognito, that provides authentication, authorization, and user management for the application 110. The authentication module may therefore provide customers, and other users of the application 110, with sign-up and sign-in options on accessing the self-service portal 130. System 100 may include an Email Service that sends notification emails to customers. In some embodiments, the Email Service may be cloud-based and cooperates directly with the application 100 via an SDK.

Figure 2:
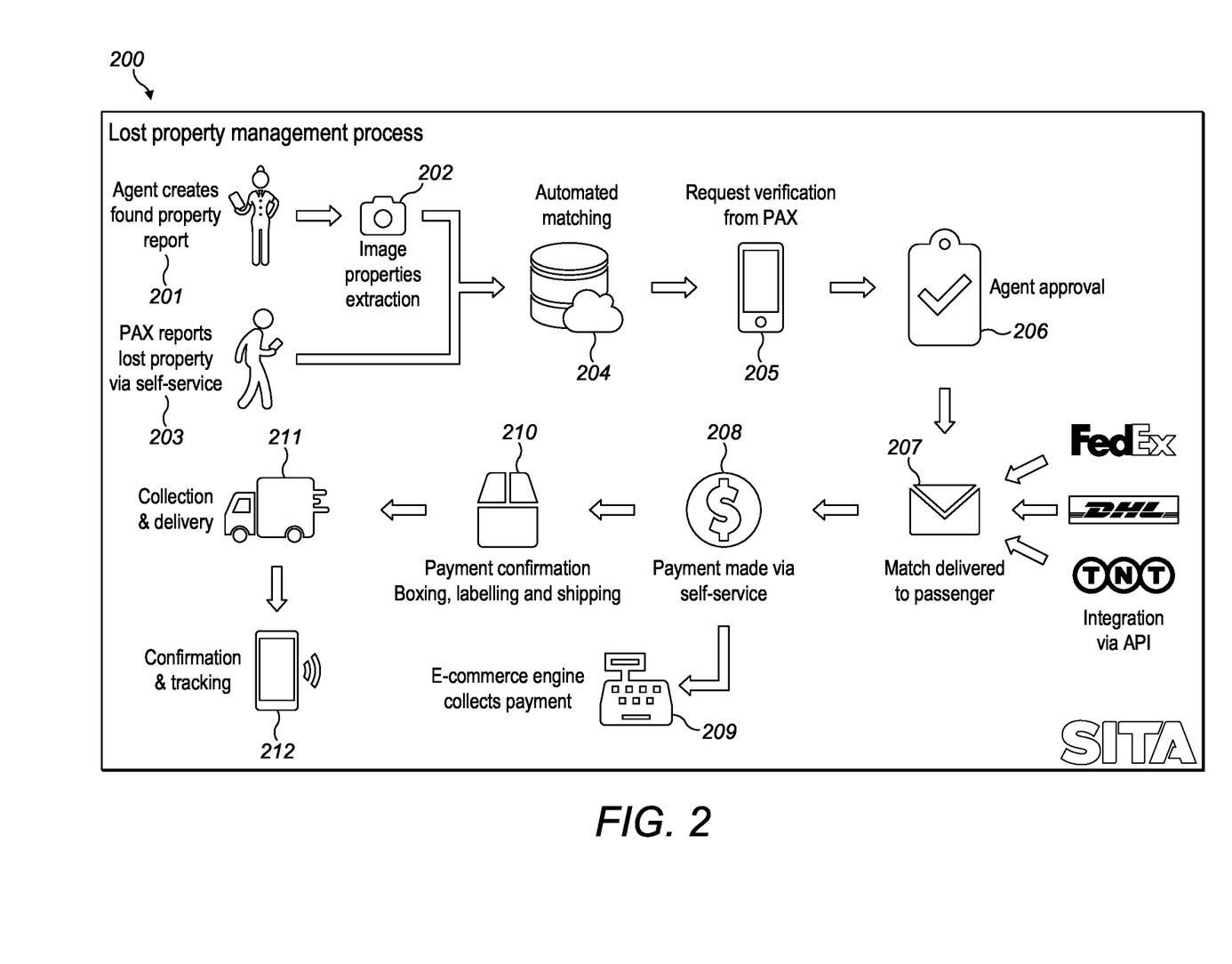
FIG. 2 shows a flow diagram of an example process for managing lost items.

FIG. 2 shows a high level flow diagram of a process 200 according to an embodiment of the invention.

In Step 201, an airport agent finds a lost item of property and creates a found property report. In preferred embodiments, this may be achieved by capturing an image of the found item and generating a found item report with a mobile application. The found item report may automatically record the date, time, brief description of the item, and any damage to the item. In embodiments of the invention, the process to register a found item may take approximately 30 seconds.

In Step 202, image properties and metadata are extracted from the captured images of the item. The identified metadata undergoes an analysis and verification process to ensure that the metadata is correct and enables efficient and accurate matching.

In some embodiments, metadata extraction may be performed using computer vision techniques to identify the probable properties of an item, usually with an associated degree of certainty. These categories may then be recorded in a database and processed using the matching engine, or displayed, to assist in identifying a lost item of property. Embodiments of the invention may use one or more computer vision models combined or in an ensemble, to identify various different features of an article. In this context, computer vision is understood to mean the high-level processing of digital images by acquiring and processing data in order to analyse and understand it. Computer vision techniques may include object recognition, learning, indexing, and image restoration. The computer vision techniques may be leveraged to locate and identify features of the article using machine learning models. In this way, the system can automatically identify a set of characteristics associated with the article, such as a colour, sticker, added marker, object category or texture.

The system according to the claimed invention is able to dramatically reduce operational costs compared to the operational costs associated with implementing and maintaining known rectification systems for mishandled articles. This is because there is no need for the labour-intensive manual examination of each article in order to correctly identify a mishandled article.

In Step 203, a customer (such as an airline passenger) reports an item as lost property by creating a lost property report via the self-service portal. As described above, the portal is accessible online at any time from any location, resulting in no calls to call centre or erratic input data information. The lost property report may be stored, and is fully searchable based on certain metadata fields, such as category or date of report.

In Step 204 an automated matching engine suggests matches between lost property reports and found property reports that are stored in a single shared database. As indicated above, a single shared database advantageously provides a multi-tenancy solution. A multi-tenancy database can enable an airport agent at a first location record an item found at the airport, and for an airline agent at a second location to receive and process a lost item report at a second location. The multi-tenancy database enables information held by the airport agent at the first location and by the airline agent at the second location to be shared securely between different companies to provide a more efficient system of returning lost items. Additionally, a single user of the system can log items on behalf of different entities. For example a single airport agent could record a number of found items for a first flight on behalf of British Airways, and then record further found items for a second flight on behalf of Qatar Airways.

The most important metric to identify matches between lost and found property reports is location information. For implementations of the invention in the ATI, the location information may be the route that the passenger was travelling on when the item was reported lost. This has been found to be more effective at matching lost and found property reports, rather than the airline, or flight number. Embodiments of the invention have been found to validate a match between lost and found property reports in approximately 30 seconds, which greatly reduces the amount of time required to process customer enquiries.

Optionally, at Step 205, if a lost property report is matched with a found item, the data associated with the found item may be provided to the customer who sent the lost property report so that the customer may verify that the found item is their property. In some embodiments, the system may request that the customer provides further information to verify an identified match between a lost item and one or more found items. The customer may be able to view the history of the lost item based on the data provided by the agents. If the matched item is not the customer's lost property, the system may optionally enable the customer to amend their original lost property report. In some embodiments, verification includes requesting a passenger name record (PNR), which provides an additional level of security by ensuring that only passengers who have been on a flight can make a claim. In these embodiments, the system 100 integrates with a departure control system (DCS) to retrieve a list of PNRs to validate the lost property report.

In Step 206, an agent approves the identified match, which may occur after the ownership of the found item of property has been verified by the customer. At that point, the customer is notified that their item has been found.

Optionally, the customer may elect for their lost property to be repatriated by an offered delivery or collection method. This may be achieved by cooperating with one or more delivery or courier services via an API in Step 207. In Step 208, the customer may make a payment via the self-service portal and via an e-commerce engine that collects payment on behalf of the authority responsible for handling the lost property in Step 209. This enables the customer to assume at least partial responsibility of the repatriation process. Optionally, the customer may also be able to purchase delivery insurance to cover the item in case of loss or damage during transit. In Step 210, once payment is confirmed the lost item is sent for boxing, labelling and shipping and the customer receives shipping confirmation, invoice and shipment details. In step 211, the delivery company assumes responsibility for collecting and delivering the lost item to the customer and may provide shipment tracking updates to the customer in step 212. Alternatively, delivery tracking updates may be provided the self-service portal 130. Finally, if an E-commerce engine has collected payment from the customer then the e-commerce engine performs automated financial reconciliation to the authority responsible for handling the lost property.

Further to the above, in a particular example the step of extracting image properties and metadata for a brown satchel may result in receiving the following pseudocode:

```
{
  "token": "FQybDLHcgin1Je5_JmX2g",
  "ttl": S4,
  "status": "completed",
  "url": "https://assets.cloudsight.ai/uploads/image_request/image.jpg"
  "name": "black leather crossbody bag screenshot",
  "nsfw": false,
  "categories": [
    "fashion-and-jewellery"
  ],
  "similar_objects": [
    "suitcase",
    "screenshot",
    "crossbody bag"
  ],
  "structured_output": {
    "framing": [
      "screenshot",
    ],
    "colour": [
      "black"
    ],
    "material": [
      "leather"
    ]
  }
}
```

Figure 3A:
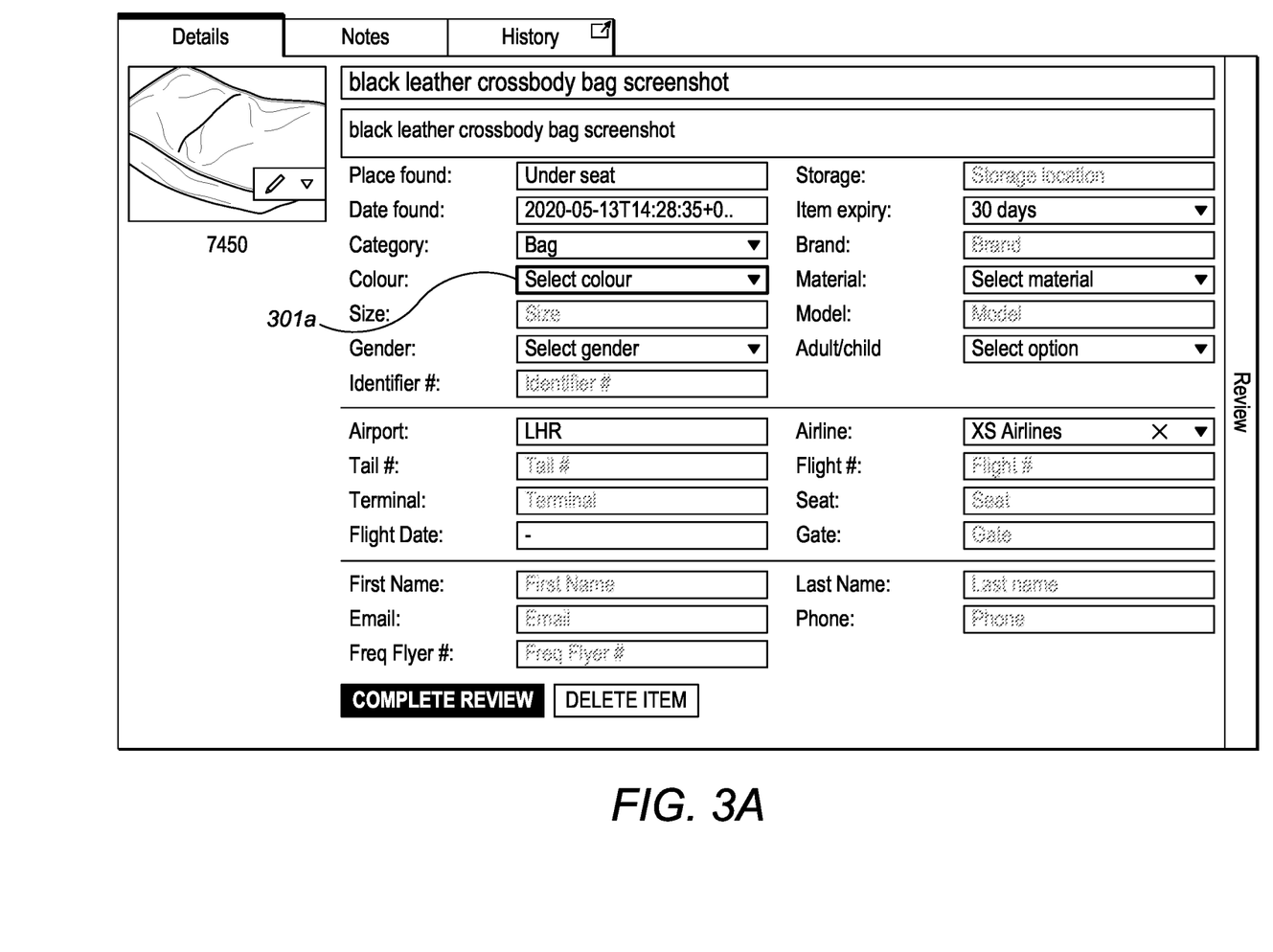
FIG. 3A shows a first example of a review screen of a lost item report.

As will be seen from the above, the image analysis has identified that the bag is a cross-body bag, that is made of leather and is black. This metadata may be used to populate a report, and the metadata may be reviewed by a handling agent as shown in FIG. 3A. Additional metadata and information, for example flight-related information, may be retrieved from other sources and used to populate the report, and as also shown in FIG. 3A.

Figure 3B:
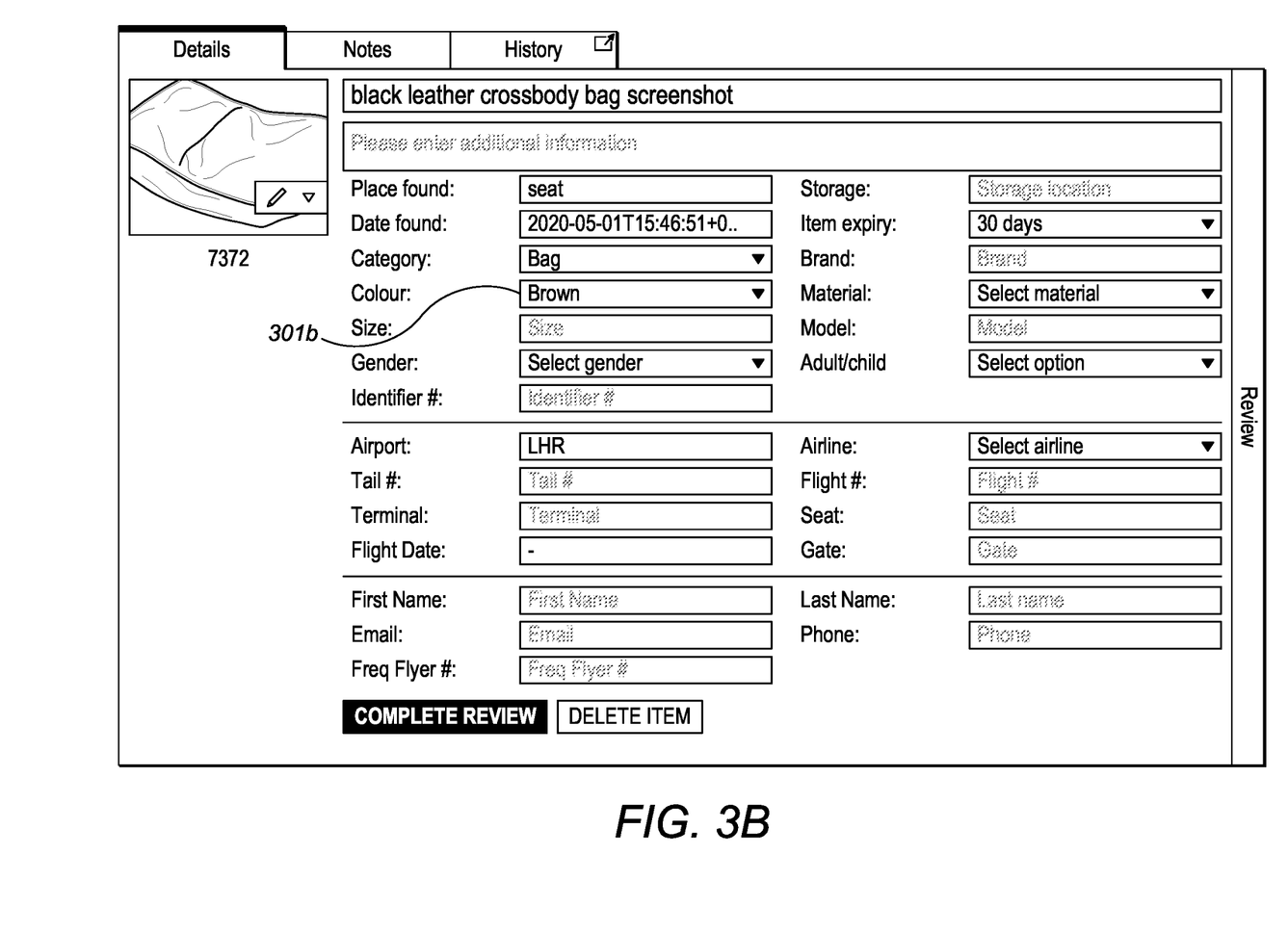
FIG. 3B shows a second example of a review screen of a lost item report.

The agent that found the item can review the report and make validate the metadata generated during analysis of the image. In the above example, it will be noted that the bag is a brown satchel, but the generated metadata above indicates that the bag is a black cross-body bag. If necessary, the agent can amend this metadata before the report is finalised. As shown in FIG. 3A the category field for "colour" 301a has been cleared from black by the agent and the category field for "colour" 301b in FIG. 3B is changed to brown.

Figure 4:
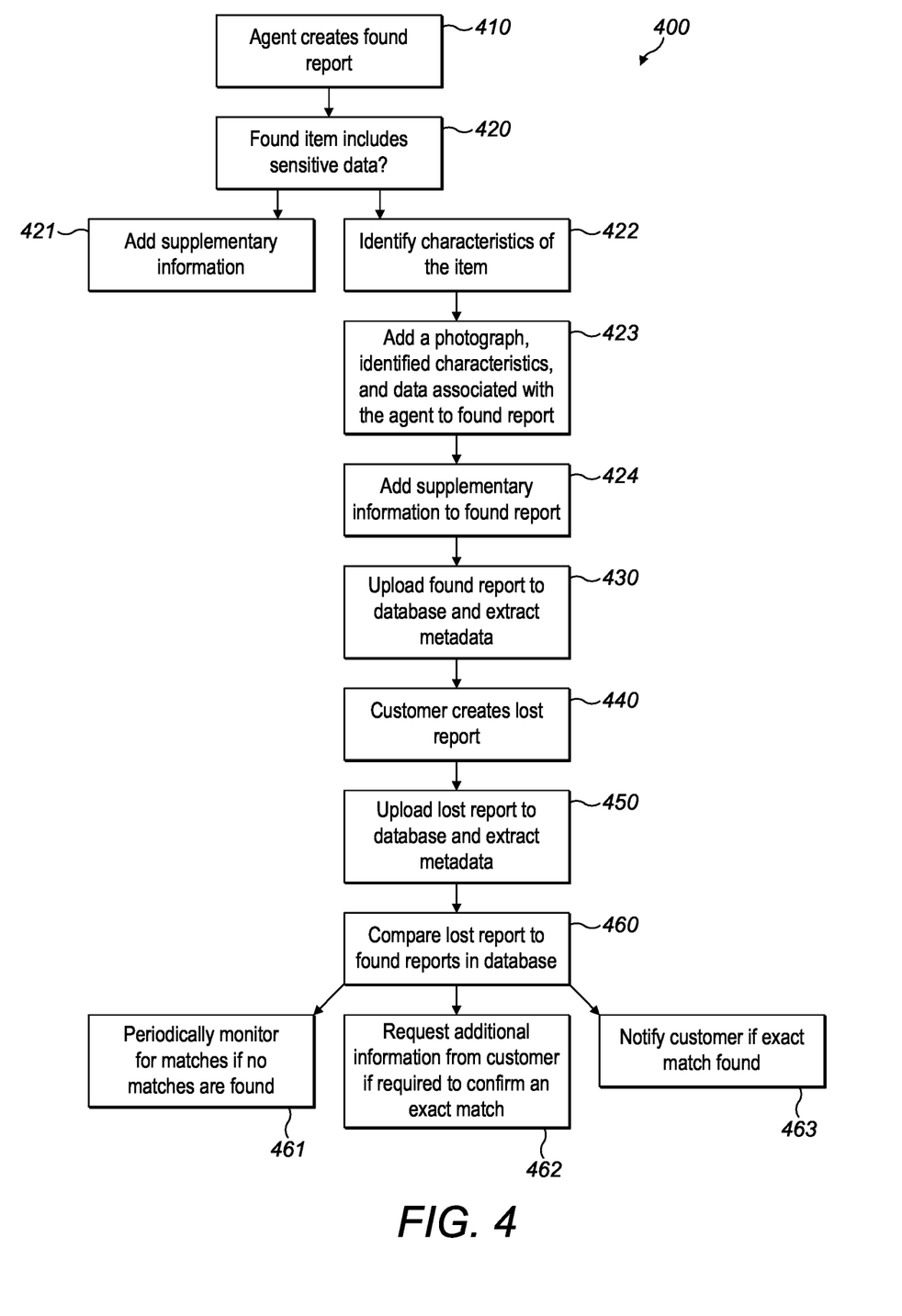
FIG. 4 shows another flow diagram of an example process for managing lost items.

FIG. 4 shows a high level flow diagram of a method 400 performed by system 100 according to an embodiment of the invention. More specifically, FIG. 4 shows a method for tracing, locating and repatriating lost property using image recognition technology to automate the creation of identified lost property reports and a matching engine to automate the matching of identified lost property reports with reports submitted by the owners of lost property.

In a first step 410, when an item of lost property is found, for example on an aircraft or at an airport, an agent responsible for handling lost items, for example an airline agent or member of airport security uses the self-service portal 130, for example with a mobile application, to create a found item report.

In a second step 420, where the item contains sensitive data, for example a passport or other form of photo ID, the Agent may manually add supplementary information to the Found Report in step 421, such as the item title, where it was found, airline, flight number, seat number, tail number of the aircraft and terminal and gate number of where the item was found. Additionally, the date of travel may be derived from the tail number of the aircraft and the flight number. If the item does not contain sensitive data, the Agent may use a mobile device to photograph the found item and use the mobile application to: identify characteristics of the item in step 422, such as brand, model, size, colour, material, and shape using image recognition software; add the photograph, the identified characteristics, and any data associated with the Agent or Agent device, such as the time, airport and agent ID to the Found Report in step 423; and add supplementary information, as described above, to the Found Report in step 424.

In a third step 430, the Found Report is then uploaded to a database and natural language data processing is applied to the information in the Found Report to extract metadata associated with elements of the Found Report. In the context of the invention, the extracted metadata will comprise the value of a particular characteristic of an item. For example, the value associated with a product category (such as "passport", "glasses", "household", or "bag"). Extracting metadata beneficially facilitates easy matching of the Found Report to a lost item report. In preferred embodiments, a unique reference number is associated with each found item. This enables agents to search for a particular found report using the reference number, and may be able to generate a 2-D bar code, such as a QR code, that is associated with each unique reference number for each item. An agent may then print the QR code and attach the code to a storage container where the particular item is being stored. The agent can then retrieve information about the found items within the storage container without unpacking or moving the container.

In a fourth step 440, when an item of property has been lost, the customer who lost the item generates a Lost Report detailing the lost item via the self-service portal 130. As for found items, natural language data processing may be applied to the information in the Lost Report to extract metadata associated with elements of the Lost Report. In some embodiments, the Lost Report may be generated before a Found Report has been created and, once a Lost Report is created it may be updated later, for example to include an uploaded picture of the lost item or an invoice to prove ownership of the lost item. The Lost Report may include the following information: item-related information associated with the lost item, such as the category, item description, size, colour, model, brand and distinguishing features, and customer-related information associated with the customer, such as the customer's contact details, point of departure, destination, flight number, date, time, and travel route. In some embodiments, the Lost Report may also include the location and time where the customer believes the item was lost. The system can use the location and time to identify flight related information from the flight information module and thereby identify potential locations where the lost item may have been found.

In a fifth step 450, the Lost Report is uploaded to the database and, as for the Found Report, natural language data processing is applied to the information in the Lost Report to extract metadata associated with elements of the Lost Report.

In a sixth step 460, the Lost Report is compared with all Found Reports listed in the database. In preferred embodiments, this is achieved in the following manner. First, the matching engine analyses the item-related information the customer-related information from the Lost Report and the metadata obtained from known Found Reports to identify potential matches between a Lost Report and known Found Reports. Next, a score is attributed to each potential match via a configurable weighted system as described above. Any potential match scoring above a threshold value triggers a notification message to be sent to the Agent responsible for the system. The responsible Agent reviews the potential matches listed in the notification message and may take one of the following decisions:

the Lost Report does not match any of the Found Reports identified;

additional information is required to confirm a match between the Lost Report and the identified Found Report(s); or the Lost Report matches one of the Found Reports identified.

If the Agent confirms that the Lost Report does not match any Found Reports, the Agent may reject the suggested match. The matching engine may then continue to assess the Lost Report against Found Reports at periodic intervals to determine if the Lost Report matches with any new Found Reports in step 461.

If the Agent requires additional information to confirm or rule out a match between a Lost Report and a Found Report, then a notification may be sent to the customer containing specific questions regarding additional distinguishing factors, such as the style/colour of a phone case, phone display background, or to request a photo of the lost item in step 462. The customer may respond to this notification via the self-service portal, or other known means of communication.

If the Agent confirms the Lost Report matches one of the Found Reports then a notification—by email, text, or other form of communication—may be sent to the customer notifying them that their lost item has been found in step 463. In some embodiments, the notification includes an invitation for the customer to log into a Web Form. The Web Form provides the customer with the option to collect the found item in person or have it delivered to them. The customer is able to select a return option and, if required, pay an associated fee. In some embodiments, the item may not be able to be delivered for example if the item is perishable (such as alcohol or food). In addition, some items, such as knives, watches, and items with batteries, may require approval from an airport agent or delivery agent to confirm that the item is suitable for courier delivery.

Where the customer chooses to have the item couriered to them, the customer may be requested to insert their desired delivery address. The customer may also be requested to provide a phone number to enable a verification process before the item is delivered. The application 110 makes API calls to various third party courier service providers to obtain quotes for the return of the item to the customer and the different delivery services available. Once the customer has selected their chosen delivery method, or where the customer selects to collect the parcel themselves, they are then required to pay the associated fee and delivery charge (if applicable) via the payment portal in the App. Once the payment has been processed, the customer is sent a notification via email or SMS that their item has been shipped or is ready for collection and a full VAT receipt is included. In some embodiments, where the customer elects to have the item couriered, further API calls may be made to the chosen courier to request collection of the item and a delivery label is printed. In an embodiment, the customer may decline to have the item returned to them if it is not worth the associated fees. Positively identifying items that are no longer wanted enables airport agents to free up storage space for other found items.

In preferred embodiments, each stage of the method described above is recorded to create a fully auditable record in respect of all found items for which a Found Report is generated.

Further embodiments of the invention may enable revenue sharing for situations where the responsibility for managing lost property is shared between multiple stakeholders. For example, a passenger may travel on a multi-leg journey from Singapore to JFK via London Heathrow with a ticket bought from Singapore Airlines, where the journey comprises flying from Singapore to London with Singapore Airlines and from London to JFK with British Airways. Typically, if the passenger were to lose an item at JFK, and the item were to be found by British Airways staff, then British Airways take ownership of the lost item. The customer may be unsure whether to contact JFK airport, i.e. the location where the item was lost, British Airways, i.e. the airline that they travelled with to the final destination, or Singapore Airlines, i.e. the company they bought their ticket from.

For the above scenario, at present British Airways would collect any revenue for repatriating the lost item as they assumed responsibility for ownership of the found item. However, for the presently described invention revenue may be collected for a number of services, such as delivery of the item back to the customer, a transaction fee, a usage fee, etc. Accordingly, the revenue generated from repatriating lost property may be shared between British Airways, who found the item, Singapore Airlines, who sold the ticket, and SITA, who provide the systems and services described above.

From the foregoing, it will be appreciated that the image processing device may include a computing device, such as a desktop computer, a laptop computer, a tablet computer, a personal digital assistant, a mobile telephone, a smartphone.

The device may comprise a computer processor running one or more server processes for communicating with client devices. The server processes comprise computer readable program instructions for carrying out the operations of the present invention. The computer readable program instructions may be or source code or object code written in or in any combination of suitable programming languages including procedural programming languages such as C, object orientated programming languages such as C#, C++, Java, scripting languages, assembly languages, machine code instructions, instruction-set-architecture (ISA) instructions, and state-setting data.

The wired or wireless communication networks described above may be public, private, wired or wireless network. The communications network may include one or more of a local area network (LAN), a wide area network (WAN), the Internet, a mobile telephony communication system, or a satellite communication system. The communications network may comprise any suitable infrastructure, including copper cables, optical cables or fibres, routers, firewalls, switches, gateway computers and edge servers.

The system described above may comprise a Graphical User Interface. Embodiments of the invention may include an on-screen graphical user interface. The user interface may be provided, for example, in the form of a widget embedded in a web site, as an application for a device, or on a dedicated landing web page. Computer readable program instructions for implementing the graphical user interface may be downloaded to the client device from a computer readable storage medium via a network, for example, the Internet, a local area network (LAN), a wide area network (WAN) and/or a wireless network. The instructions may be stored in a computer readable storage medium within the client device.

As will be appreciated by one of skill in the art, the invention described herein may be embodied in whole or in part as a method, a data processing system, or a computer program product including computer readable instructions. Accordingly, the invention may take the form of an entirely hardware embodiment or an embodiment combining software, hardware and any other suitable approach or apparatus.

The computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

Exemplary embodiments of the invention may be implemented as a circuit board which may include a CPU, a bus, RAM, flash memory, one or more ports for operation of connected I/O apparatus such as printers, display, keypads, sensors and cameras, ROM, a communications sub-system such as a modem, and communications media.

The invention claimed is:

1. A method for managing lost items, the method comprising:
   receiving information associated with one or more found items, the received information including characteristics of an image of each found item;
   generating metadata associated with each found item based on the characteristics of the image of each respective found item;
   receiving item-related information associated with a lost item;
   generating metadata associated with the lost item based on the item-related information; and
   determining a score for each found item based on a comparison between the metadata associated with item-related information for the lost item and the metadata associated with each found item.

2. The method of claim 1, wherein if the determined score exceeds a threshold value the method further comprises determining that one of the one or more found items matches the lost item.

3. The method of claim 1, further comprising sending a verification request to a customer associated with the lost item to verify that the corresponding found item belongs to the customer.

4. The method of claim 3, wherein if a found item is verified by the customer the method further comprises sending a further verification request to a handling agent to verify that the found item matches the lost item.

5. The method of claim 3, wherein the method further comprises requesting auxiliary item-related information if one or more found items are not verified by the customer.

6. The method of claim 1, wherein the method further comprises requesting auxiliary item-related information if the determined score does not exceed a threshold value.

7. The method of claim 1, further comprising periodically monitoring for matches based on received information associated with further found items if the determined score does not exceed a threshold value.

8. The method of claim 1, further comprising sending a notification indicating that a lost item has been found if the found item is verified by a customer and/or a handling agent.

9. The method of claim 1, wherein a score is determined for a set of found items, the set of found items being based on a current status of the lost item, and a time since the found item was discovered.

10. The method of claim 1, wherein determining a score comprises determining individual scores for each of a plurality of item categories associated with the lost item and each of the found items and summing the individual scores.

11. The method of claim 10, wherein determining the individual scores for each item category comprises analysing one or more text strings associated with the corresponding item category for the lost item and each of the found items.

12. The method of claim 10, wherein determining the individual scores for each item category is based on a predetermined weighting coefficient allocated to each item category.

13. The method of claim 1, further comprising analysing the image of each found item to automatically determine the characteristics of the image and a set of characteristic values associated with the found item.

14. The method of claim 1, wherein the received information associated with each found item includes location information indicative of where the item was found.

15. The method of claim 1, further comprising receiving customer-related information associated with a customer who owns the lost item.

16. The method of claim 1, further comprising cooperating with a flight information module to retrieve passenger journey information associated with a customer who owns the lost item.

17. The method of claim 1, wherein determining a score for each found item is also based on a comparison between location information associated with each found item and the retrieved passenger journey information.

18. The method of claim 1, further comprising cooperating with a delivery module to arrange delivery of the found item to a customer.

19. The method of claim 18, wherein the delivery module interfaces with one or more courier delivery services to enable a lost item to be returned.

20. A system for managing lost items, the system comprising:

an application configured to receive information associated with one or more found items, the received information including characteristics of an image of each found item, the application being further configured to receive item-related information associated with a lost item;

the application being further configured to generate metadata associated with each found item based on the characteristics of the image of each respective found item, and metadata associated with the lost item and received information associated with each found item; and a matching engine configured to determine a score for each found item based on a comparison between the item-related information for the lost item and the metadata associated with each found item.

* * * * *